United States Patent [19]
Harwood et al.

[11] Patent Number: 6,110,589
[45] Date of Patent: Aug. 29, 2000

[54] POLYARYLENE SULFIDE MELT BLOWN FIBERS AND PRODUCTS

[75] Inventors: Colin F. Harwood, Tucson, Ariz.; Isaak Vasserman, Whitestone; Thomas C. Gsell, Glen Head, both of N.Y.

[73] Assignee: Pall Corporation, East Hills, N.Y.

[21] Appl. No.: 08/880,815

[22] Filed: Jun. 24, 1997

Related U.S. Application Data

[60] Division of application No. 08/598,475, Feb. 8, 1997, Pat. No. 5,690,873, which is a continuation-in-part of application No. 08/570,313, Dec. 11, 1995, abandoned.

[51] Int. Cl.[7] .................................................. D02G 3/00
[52] U.S. Cl. .......................................... 428/364; 428/373
[58] Field of Search .................................. 428/364, 372, 428/373, 374; 525/189; 210/323.2; 442/327

[56] References Cited

U.S. PATENT DOCUMENTS

| | | |
|---|---|---|
| 2,411,660 | 11/1946 | Manning . |
| 3,825,380 | 7/1974 | Harding et al. . |
| 3,895,091 | 7/1975 | Short et al. . |
| 3,912,695 | 10/1975 | Short et al. . |
| 4,021,281 | 5/1977 | Pall . |
| 4,110,265 | 8/1978 | Hodgdon . |
| 4,454,189 | 6/1984 | Fukata . |
| 4,610,916 | 9/1986 | Ballard ...................................... 428/364 |
| 4,707,228 | 11/1987 | Rubak . |
| 4,726,987 | 2/1988 | Trask et al. . |
| 4,748,077 | 5/1988 | Skinner et al. .......................... 428/364 |
| 4,801,492 | 1/1989 | Skinner et al. . |
| 4,806,407 | 2/1989 | Skinner et al. .......................... 428/364 |
| 4,895,634 | 1/1990 | Guiffre et al. . |

(List continued on next page.)

FOREIGN PATENT DOCUMENTS

| | | |
|---|---|---|
| 001281 | 4/1979 | European Pat. Off. . |
| 0 102 536 | 3/1984 | European Pat. Off. . |
| 158989 | 10/1985 | European Pat. Off. . |
| 0 195 422 | 9/1986 | European Pat. Off. . |
| 221691 | 5/1987 | European Pat. Off. . |
| 292186 | 11/1988 | European Pat. Off. . |
| 316195 | 5/1989 | European Pat. Off. . |
| 339240 | 11/1989 | European Pat. Off. . |
| 709499 | 5/1996 | European Pat. Off. . |
| 55-142757 | 11/1980 | Japan . |
| 56-033511 | 4/1981 | Japan . |
| 58-031112 | 2/1983 | Japan . |
| 61-289162 | 12/1986 | Japan . |
| 63-219653 | 9/1988 | Japan . |
| 63-315655 | 12/1988 | Japan . |
| 52-30609 | 2/1992 | Japan . |

OTHER PUBLICATIONS

WPI Accession No. 89–073462/10 (Derwent Info. Ltd.) (JP 01–026670) (Jan. 27, 1989).
WPI Accession No. 83–797471/43 (Derwent Info. Ltd.) (JP 58–154757) (Sep. 14, 1983).
WPI Accession No. 85–009427/02 (Derwent Info. Ltd.) (JP 59–207921) (Nov. 26, 1984).
WPI Accession No. 95–229173 (Derwent Info. Ltd.) (JP 07–138860) (May 30, 1995).
WPI Accession No. 95–085945 (Derwent Info. Ltd.) (JP 07–011556) (Jan. 13, 1995).
WPI Accession No. 90–134630 (Derwent Info Ltd.) (JP 02–080651) (Mar. 20, 1990).
Patent Abstracts of Japan, European Patent Office, AN–01234684 (JP 3097757 abstract) (Apr. 23, 1991).

*Primary Examiner*—Newton Edwards
*Attorney, Agent, or Firm*—Leydig, Voit & Mayer, Ltd.

[57] ABSTRACT

The present invention provides a method of preparing polyarylene sulfide fibers, particularly polyphenylene sulfide fibers, comprising melt blowing a blend of polyarylene sulfide and a polyolefin, wherein the polyolefin is present in the blend in an amount of up to about 40% by weight of the total blend. The present invention also provides fibers, webs, and other products prepared in accordance with the present inventive method.

23 Claims, 1 Drawing Sheet

U.S. PATENT DOCUMENTS

| | | |
|---|---|---|
| 4,935,473 | 6/1990 | Fukuda et al. . |
| 4,942,091 | 7/1990 | Umezawa et al. . |
| 4,950,529 | 8/1990 | Ikeda et al. . |
| 4,968,733 | 11/1990 | Miller et al. . |
| 5,009,519 | 4/1991 | Tatum . |
| 5,021,288 | 6/1991 | Jezic . |
| 5,026,764 | 6/1991 | Okabe et al. . |
| 5,028,644 | 7/1991 | Heinz et al. . |
| 5,039,730 | 8/1991 | Yokoyama . |
| 5,043,112 | 8/1991 | Beck . |
| 5,075,161 | 12/1991 | Nyssen et al. . |
| 5,116,906 | 5/1992 | Mizuno et al. . |
| 5,132,363 | 7/1992 | Furuta et al. . |
| 5,182,151 | 1/1993 | Furuta et al. . |
| 5,218,048 | 6/1993 | Abe et al. . |
| 5,227,427 | 7/1993 | Serizawa et al. . |
| 5,244,467 | 9/1993 | Umezawa et al. . |
| 5,292,789 | 3/1994 | Ishida et al. . |
| 5,296,527 | 3/1994 | Boudreaux, Jr. . |
| 5,349,027 | 9/1994 | Ueki et al. . |
| 5,350,833 | 9/1994 | Inoue et al. . |
| 5,384,391 | 1/1995 | Miyata et al. . |
| 5,403,888 | 4/1995 | Nishio et al. . |
| 5,405,902 | 4/1995 | Nishio et al. . |
| 5,424,012 | 6/1995 | Ertle et al. . |
| 5,428,091 | 6/1995 | Abe et al. . |
| 5,430,102 | 7/1995 | Glaser et al. . |
| 5,449,722 | 9/1995 | Nishida et al. . |
| 5,456,973 | 10/1995 | Ballard et al. ............... 428/373 |
| 5,591,335 | 1/1997 | Burboza et al. ............... 210/489 |
| 5,667,890 | 9/1997 | Ballard et al. ............... 428/364 |
| 5,681,469 | 10/1997 | Barboza et al. ............... 210/509 |
| 5,690,873 | 11/1997 | Harwood et al. ............... 428/373 |

FIG. 1

POLYARYLENE SULFIDE MELT BLOWN FIBERS AND PRODUCTS

CROSS-REFERENCE TO RELATED APPLICATION

This patent application is a divisional of U.S. patent application Ser. No. 08/598,475, filed Feb. 8, 1997, now U.S. Pat. No. 5,690,873, which is a continuation-in-part of U.S. patent application Ser. No. 08/570,313, filed Dec. 11, 1995, now abandoned.

TECHNICAL FIELD OF THE INVENTION

The present invention generally relates to polyarylene sulfide resin melt blowing methods and products. In particular, the present invention relates to polyphenylene sulfide (PPS) melt blowing methods, melt blown fibers, and other products, especially fibrous webs useful in various filter applications.

BACKGROUND OF THE INVENTION

Polyarylene sulfide resins, exemplified by PPS, are known for their chemical and heat resistance. For instance, a PPS nonwoven fabric can be used for extended periods at temperatures as high as 190° C. This is in contrast to typical maximum continuous use temperatures of 80° C. for polypropylene fiber and 120° C. to 130° C. for polyester fiber. PPS fiber also has superior wet heat resistance, e.g., it can be used in steam having a temperature of up to 160° C. As a result of its excellent heat resistance, wet heat resistance, resistance to chemicals, and fire retardant properties, polyarylene sulfide has been used in a wide variety of products, such as filters, fire retardant electrical insulating materials, battery separators, and separators for electrolyzers used in producing hydrogen and oxygen by water electrolysis.

The preparation of fibers and fibrous articles from arylene sulfide polymers, particularly PPS, has been known for some time. In general, a polyallylene sulfide polymer such as PPS is melted in an extruder. The molten polymer is then extruded from a plurality of orifices. A heated high pressure gas is fed on both sides of each orifice to blow a stream of molten polymer. The molten polymer is drawn, thinned, and set to a shape of fine fiber. The fiber is then collected as a web on a screen collector.

There has been some suggestion that PPS fibers can be prepared by heating PPS polymer, which has an inherent viscosity of 0.15 to 0.25, at an elevated temperature for a period of time sufficient to at least partially cure the polymer and thus produce a polymer with a melt flow rate or index in the range of 75 to 800. The partially cured polymer is then melt-spun through orifices, followed by drawing of the thus melt-spun filaments while still in the molten state.

Unfortunately, many difficulties have been encountered in the melt blowing of polyarylene sulfide resins, particularly of PPS resins. Melt blowing represents the most difficult melt extrusion process as a result of the elevated temperatures which are employed in melt blowing, which are generally up to about 40–70° C. higher than other melt processes, and the concomitant polymerization of polyarylene sulfide and decomposition and formation of char. During the melt blowing of such fibers, which involves heating the polyarylene sulfide resin and passing the molten resin through suitable fiberizing nozzles, the molten resin has a tendency to polymerize and/or crosslink, thereby resulting in spitting, formation of shots or balls, and clogging of the fiberizing nozzles, as well as generally restricting the fineness and quality of the formed fibers.

Attempts have been made in the industry to overcome some of these difficulties. For example, molten PPS polymer has been forced through a primary filter means having a maximum absolute pore rating of no more than about 125 $\mu$m to provide a molten primary filtered polymer, and then the molten primary filtered polymer has been forced through a secondary filter means having a maximum absolute pore rating of no more than 80 $\mu$m to provide a secondary filtered polymer. Reportedly, such a method allows for the preparation of a nonwoven fabric composed of fine PPS fibers having substantially no polymer balls. The method employs a PPS having a linear high polymer structure which has high thermal stability in the molten state and a good flowability as compared to the crosslinked-type polyallylene sulfide.

In another attempt to overcome some of the aforesaid difficulties, the melt blowing equipment is frequently started up and shut down and/or otherwise purged on a regular basis with another polymer, usually with a polyolefin such as polypropylene. Such procedures, however, only temporarily alleviate the aforesaid difficulties and impair the efficiency of fiber production, as well as the quality and quantity of fibers produced.

Thus, there exists a need for an improved method of melt blowing polyarylene sulfides which avoids, at least in part, the aforesaid difficulties, such as shot formation and clogging of the melt blowing apparatus, while being relatively easy to practice.

The present invention seeks to provide such a method of melt blowing polyarylene sulfides, as well as the resulting polyarylene sulfide fibers and other products. These and other objects and advantages of the present invention, as well as additional inventive features, will be apparent from the description of the invention provided herein.

BRIEF SUMMARY OF THE INVENTION

The present invention provides a method of preparing polyarylene sulfide fibers, particularly PPS fibers, comprising melt blowing a blend of a polyarylene sulfide and a polyolefin wherein the polyolefin is present in the blend in an amount of up to about 40% by weight of the total blend. The present invention also provides fibers, webs, and other products prepared in accordance with the present inventive method.

DETAILED DESCRIPTION OF THE PREFERRED EMBODIMENTS

The present invention is predicated, at least in part, on the surprising discovery that the inclusion of a relatively small percentage of a polyolefin in a polyarylene sulfide enables the melt blowing of polyarylene sulfide without many of the processing disadvantages attendant the melt blowing of polyarylene sulfide alone, while not adversely affecting the resulting melt blown polyarylene sulfide products, and, more surprisingly, actually improving the properties of the resulting products in certain respects. Thus, the melt blowing process can be operated continuously for considerable periods of time without the formation of shot and the clogging of the melt blowing apparatus, particularly the fiberizing nozzles. Moreover, smaller diameter fibers are more easily prepared using melt blowing as a result of the present invention.

While not seeking to be bound by any particular theory, it is believed that the polyolefin co-exists with the polyarylene sulfide as a blend and effectively functions as a lubricant in the melt blowing process. It is believed that the lubricant prevents, or at least delays, the build up of the polyarylene sulfide resin on the internal parts and the extrusion orifices, e.g., nozzles, of the melt blowing apparatus. This resin would otherwise decompose into a problem char. The relatively small amount of polyolefin that remains in the melt blown polyarylene sulfide product has no adverse effect and, indeed happens to have a beneficial effect on the desirable fiber properties of the melt blown product.

The melt blown polyarylene sulfide products resulting from the present invention have several improved desirable properties. For example, PPS fibers in accordance with the present invention are whiter than those produced without the use of the polyolefin additive. The color of the fibers survived better when baked in a hot oven than the fibers produced without the use of the polyolefin additive. The oil resistance of the fibers was better than that of the fibers produced without the use of the polyolefin. In particular, fibers produced using 5 wt. % polypropylene survived a soy oil soak at 204° C. (400° F.) better than the fibers prepared without the polypropylene. It was also possible to produce much finer fibers by the method of the present invention.

Accordingly, the present invention provides a method of preparing polyarylene sulfide fibers, particularly PPS fibers, by melt blowing a blend comprising a polyarylene sulfide and a polyolefin. Preferably, the blend consists essentially of, and, most preferably, consists of, a polyarylene sulfide and a polyolefin.

Any suitable polyarylene sulfide can be used in the present invention. Generally, the polyarylene sulfide will primarily include repeating units represented by the formula —(Ar—S)— wherein Ar is an arylene group. Suitable arylene groups include p-phenylene, m-phenylene, o-phenylene, and substituted phenylene groups wherein the substituent is an alkyl group preferably having 1 to 5 carbon atoms or a phenyl group. Additional examples of the arylene group include p,p'-diphenylene sulfone, p,p'-biphenylene, p,p'-diphenylene ether, p,p'-diphenylenecarbonyl, and naphthalene groups, and substituted derivatives thereof, wherein the substituent is an alkyl group preferably having 1 to 5 carbon atoms or a phenyl group. Blends of two or more polyarylene sulfides can also be used in the present invention. Arylene sulfide copolymers containing more than one of the aforesaid arylene groups can be used in the present invention. It is to be understood that poly(p-phenylene sulfide) is commonly referred to as polyphenylene sulfide (PPS), and the polyarylene sulfide used in the present invention is preferably PPS.

Any suitable grade of PPS can be used in the present invention. Suitable PPS resins include cured, semi-cured, or linear PPS, such those sold by Toray PPS Co. (Japan), Kureha Chemical Co. (Japan), and Philips Petroleum Co. (U.S.).

The polyarylene sulfide, particularly PPS, is preferably linear. It is further preferred that the linear polyarylene sulfide has a low melt crystallization temperature ($T_{mc}$) preferably about 225° C. or below, and more preferably in the range of about 170–200° C.

The polyarylene sulfide, particularly PPS, can have any suitable melt flow rate, and will preferably have a melt flow rate of about 2,000 g/10 min or less, preferably about 600 g/10 min or less, and most preferably about 300 g/10 min or less, e.g., about 50–300 g/10 min, measured at 318° C. under 5 kg load. The melt flow properties of some of the commercially available PPS resins are set forth in Table 1.

TABLE 1

EXAMPLES OF SOME COMMERCIALLY AVAILABLE* PPS RESINS AND THEIR PROPERTIES

| Polymer Type | Melt Flow at 318° C. (g/10 min) |
|---|---|
| (a) Cured | |
| M3910 | 2000 |
| M2900 | 600 |
| M2100 | 120 |
| M1900 | 75 |
| (b) Semi-Cured | |
| L2840 | 750 |
| L2120 | 120 |
| (c) Linear | |
| (i) High $T_{mc}$** | |
| M2888 | 600 |
| M2588 | 300 |
| M2088 | 100 |
| (ii) Low $T_{mc}$** | |
| E2481 | 225 |
| E2280 | 160 |
| E2180 | 130 |
| E2080 | 100 |
| E1880 | 70 |

*From Toray PPS, Inc.
**$T_{mc}$ = Melt Crystallization Temperature

The PPS resin can have any suitable melt viscosity, preferably from about 600 to about 4,000 (100 sec$^{-1}$) poises. Some of the physical properties of the PPS resins are set forth in Table 2.

TABLE 2

PROPERTIES OF SOME COMMERCIAL PPS RESINS*

| Property | Unit | Cured M2900 | Cured M2100 | Semi-Cured L2120 | Linear High $T_{mc}$ M2888 | Linear High $T_{mc}$ M2588 | Linear Low $T_{mc}$ E2481 | Linear Low $T_{mc}$ E1880 |
|---|---|---|---|---|---|---|---|---|
| Appearance | | Brown Powder | Brown Powder | Brown Powder | White Granule | White Tan Granule | White Granule | White Granule |
| Bulk Density | g/ml | 0.5 | 0.5 | 0.4 | 0.5 | 0.5 | 0.5 | 0.5 |
| Melt Flow Rate at 318° C. | g/10 min | 800 | 120 | 120 | 600 | 300 | 225 | |
| Melt Viscosity | | | | | | | | |
| 1100 sec$^{-1}$ | poise | 200 | 1200 | 1300 | 400 | 800 | 1000 | 2500 |
| 100 sec$^{-1}$ | poise | 700 | 2800 | 3000 | 800 | 1200 | 1500 | 4000 |
| Ash | wt % | 0.7 | 0.7 | 0.2 | <0.1 | <0.1 | 0.3 | 0.3 |
| 150° C. Volatile | wt % | <0.1 | <0.1 | <0.1 | <0.1 | <0.1 | <0.1 | 0.1 |
| DSC (melt pressed film) | | | | | | | | |
| $T_g$ | ° C. | 90 | 90 | 90 | 90 | 90 | 90 | 90 |
| $T_m$ | ° C. | 280 | 280 | 280 | 280 | 280 | 280 | 280 |
| $T_{mc}$ | ° C. | 220 | 215 | 220 | 235 | 230 | 190 | 175 |

*From Toray PPS, Inc.
$T_{mc}$ = Melt Crystallization Temperature

The polyolefin resin that can be used in the present invention can be any suitable polyolefin and includes homopolymers and copolymers of olefins such as α-olefins exemplified by ethylene, propylene, butene-1, pentene-1, hexene-1, 3-methylbutene-1, 4-methylpentene-1, octene-1, decene-1, and the like, and combinations thereof. The polyolefin is preferably a homopolymer, most preferably polypropylene, particularly when the polyarylene sulfide is PPS and especially in the absence of other components.

Any suitable polypropylene can be used. An example of a suitable polypropylene includes Exxon's PP3045, which has a melt flow rate of 35–40 g/10 min measured at 318° C. under 5 kg load.

Any suitable amount of polyolefin can be added to the polyarylene sulfide to form the blend of polyarylene sulfide and polyolefin for use in the present invention. In general, the amount of added polyolefin will be that amount which will provide the desirable processing benefits without adversely affecting the desirable properties of the polyarylene sulfide product.

The polyolefin is desirably present in the blend in an amount of up to about 40%, e.g., about 1–40%, by weight of the total blend. Preferably, the polyolefin is present in the blend in an amount of up to about 20%, e.g., about 2–20%, by weight of the total blend, more preferably in an amount of about 2–15% by weight of the total blend, most preferably in an amount of about 2–10% by weight of the total blend, and especially in an amount of 3–7% by weight of the total blend. The amount of polyolefin is optimally about 5% by weight of the total blend.

A polyolefin of any suitable molecular weight or melt flow rate or index, for instance, a polyolefin having a melt flow rate of about 1200 g/10 min or lower, can be used in the present invention. The melt flow rate of the polyolefin is preferably in the range of from about 300 g/10 min to about 10 g/10 min, more preferably in the range of from about 100 g/10 min to about 20 g/10 min, and most preferably in the range of from about 50 g/10 min to about 25 g/10 min.

The polyarylene sulfide resin composition of the resent invention can be prepared for melt blowing using any suitable method. For instance, the blend can be processed in a single or twin screw extruder, Banberry mixer, Plastomill, or Brabender Plastograph.

The blend may contain, in addition, small amounts of other additives such as other resins, flame retardants, stabilizers, plasticizers, lubricants, pigments, fillers, and the like. Suitable other resins include polyamides such as nylon-6, nylon-66, nylon-46, and nylon-12, polyamideimides, and the like. Suitable flame retardants include phosphoric esters such as triphenyl phosphate, tricresyl phosphate, and the like. Suitable stabilizers include sterically hindered phenols, organic phosphites, oxalic acid diazides, sterically hindered amines, and the like. Suitable pigments include titanium dioxide, zinc sulfide, and the like. Suitable fillers include clay, mica, calcium carbonate, and the like. Any suitable amount of the aforesaid other additives can be used, although any additive is preferably present in an amount below about 5% by weight of the total composition, more preferably present in an amount below about 2% by weight of the total composition, and most preferably not present at all.

The melt blowing process utilized in the context of the present invention can be any suitable melt blowing process. Suitable melt blowing processes are well-known in the art and are described in, for example, U.S. Pat. Nos. 3,825,380 and 4,021,281, U.S. patent application Ser. No. 08/281,772, and PCT application PCT/US95/09972.

The '772 and '972 applications disclose a method of preparing a melt blown fibrous nonwoven web comprising extruding molten resin from two parallel rows of linearly arranged, substantially equally spaced nozzles to form fibers onto the surface of a cylindrical collector having a longitudinal axis arranged parallel to the rows of nozzles, wherein the rows of nozzles are offset from each other and are angled toward each other. The collector desirably is translated with respect to the nozzles during the fiber collection process.

U.S. Pat. No. 4,021,281 discloses a process for the continuous production of nonwoven webs in the form of a flexible tube from certain thermoplastic fibers, comprising spinning the fibers through a spinning die continuously from a melt onto a rotating mandrel and continuously withdrawing the web from the material in the form of a flattened tube.

A preferred type of spinning die has openings arranged circumferentially about the individual orifices arranged to discharge a gas at high but controlled velocity along the central axis of the orifice. The gaseous blast attenuates the fibers and tends to disrupt them so that they are broken up into discrete lengths, which can be adjusted according to the velocity and volume of the gaseous blast. The density of the web is controlled by controlling the distance between the rotating mandrel and the orifices of the spinning die through which the molten polymeric material is spun.

Additionally, U.S. Pat. No. 3,825,380 discloses a die having a special nose configuration approximating a triangle in cross section suitable for making very fine fibers from thermoplastic materials. A plurality of orifices are located in an edge-apex formed at the junction of two sides of the triangle. The included angle encompassing the edge is within the range of 30° to 90°. It is stated that there are essentially no dead spaces where polymer can collect during the melt blowing process.

It is known that the polyolefins generally have lower melting points than the polyarylene sulfides. Thus, for instance, the melting point of polyethylenes is in the range of 112–140° C., and the melting point of polypropylenes is in the range of 138–186° C. (J. Brandrup and E. H. Immergut (ed.), *Polymer Handbook,* 3d edition, pages V/19 and V/29 (1989)). Since the polyolefins have a lower melting point than polyarylene sulfides, the temperature at which the blend of polyarylene sulfide and polyolefin is melt blown in accordance with the present invention can be significantly lower than the normal melt blowing temperature of polyarylene sulfides. Thus, for instance, a blend of PPS and polypropylene can be melt blown at a temperature that is lower than the temperature typically utilized in the melt blowing of PPS alone, as illustrated in the Examples herein. The lower melt blowing temperature provides several advantages including reduced heating and cooling costs, and reduced thermal degradation of the PPS and the fibers.

The present invention accordingly provides a method of preparing a polyarylene sulfide web comprising melt blowing a blend of polyarylene sulfide with a relatively small amount of a polyolefin through one or more fiberizing nozzles, orifices, or a suitable opening. The resulting fibers can be collected on a suitable collecting surface to obtain a web. The present inventive web can have any suitable void volume %. It is preferred that the void volume % is about 60–90%, more preferably about 70–85%.

The present invention also provides a fiber prepared in accordance with the present inventive method. In particular, the present invention provides a fiber consisting essentially of, and preferably consisting of, a blend of a polyarylene sulfide and polyolefin, wherein the polyolefin is present in an amount of up to about 40%, e.g., about 1–40%, by weight of the total blend, preferably in an amount of up to about 20%, e.g., about 2–20%, by weight of the total blend, more preferably in an amount of about 2–15% by weight of the total blend, most preferably in an amount of about 2–10% by weight of the total blend, and especially in an amount of 3–7% by weight of the total blend. Optimally, the polyolefin is present in an amount of about 5% by weight of the total blend. The descriptions and preferences regarding the present inventive method are applicable to the present inventive fibers, e.g., the polyarylene sulfide is preferably PPS, and the polyolefin is preferably polypropylene.

The present inventive fiber can have any suitable diameter. Thus, for example, the present inventive fibers can have diameters ranging from less than 1 $\mu$m up to about 12 $\mu$m or more. Preferably, the present inventive fibers will have diameters of about 10 $\mu$m or less, more preferably 5 $\mu$m or less, and most preferably about 4 $\mu$m or less.

The present invention further provides a melt blown web prepared in accordance with the present inventive method and/or comprising the present inventive fibers. Thus, for example, the present invention provides a melt blown fibrous nonwoven web of fibers of a blend consisting essentially of, and preferably consisting of, polyarylene sulfide and up to about 40% polyolefin by weight of the total blend. Although the present inventive fibrous web will typically comprise fibers with a variety of diameters, the fibers of the present inventive fibrous web preferably will have an average fiber diameter of about 5 $\mu$m or less, e.g., about 3–5 $\mu$m, more preferably about 4 $\mu$m or less.

The present invention further provides a resin composition consisting essentially of, and preferably consisting of, polyarylene sulfide and polyolefin. The resin composition of the present invention can contain polyolefin in an amount of up to about 40%, e.g., about 1–40%, by weight of the total blend, preferably in an amount of up to about 20%, e.g., about 2–20%, by weight of the total blend, more preferably in an amount of about 2–15% by weight of the total blend, most preferably in an amount of about 2–10% by weight of the total blend, and especially in an amount of 3–7% by weight of the total blend. Optimally, the resin composition consists essentially of, and ideally consists of, polyarylene sulfide and a polyolefin, wherein the polyolefin is present in an amount of about 5% by weight of the total blend. The descriptions and preferences regarding the components of the resin composition in the context of the present inventive method are applicable with respect to the present inventive resin composition.

The present inventive fiber, web, and other products can be treated to impart desirable characteristics. Such treatments include, for example, heat-treatment, surface modification, and the like.

The present inventive fiber, web, and other products can be heat-treated, e.g., annealed, in any suitable manner. Such a heat-treatment can impart a greater degree of heat-resistance to the present inventive fiber, web, and other products (e.g., by changing the polymer from the amorphous phase to the crystalline phase). In particular, a non-heat-treated polyarylene sulfide fiber, web, or other product can deform at temperatures significantly less than the polyarylene sulfide melting temperature. A suitably heat-treated or annealed polyarylene sulfide fiber, web, or other product can retain a high degree of structural integrity even at temperatures relatively close to the polyarylene sulfide melting temperature. Thus, the present inventive fiber, web, and other products are preferably heat-treated or annealed, particularly when intended to be used in high-temperature environments.

To accomplish such heat-treatment or annealing, the present inventive fiber, web, and other products are desirably subjected to a temperature between the glass transition temperature ($T_g$) and the melting temperature ($T_m$), preferably above the crystallization temperature (Tc) therebetween, of the polyarylene sulfide used in the fiber, web, or other product being heat-treated for a sufficient time period, and under suitable conditions (e.g., with support), to provide the desired properties. Most preferably, the present inventive fiber, web, or other product is heat-treated so that the fiber, web, or other product uniformly achieves a temperature somewhat above $T_c$, e.g., about 1–40° C., preferably about 1–10° C., above $T_c$. The fiber, web, or other product can be held at such a temperature for any suitable period of time, generally for at least about 10–15 minutes and typically for about an hour or so. In general, the heat-treatment desirably takes place at the lowest temperature which still imparts the desired properties to the fiber, web, or other product.

The heating process can be carried out by any suitable device, e.g., an oven. During the heating process, the fiber, web, or other product being heat-treated typically will need to be supported or restrained to avoid undesirable deformation. For example, a web in the form of a tube can be supported by a metal sleeve which fits snugly in the center of the tubular web. Any suitable support means can be utilized, preferably which does not adversely affect the heating of the fiber, web, or other product.

After being heat-treated, the fiber, web, or other product can be cooled back to room temperature by any suitable technique. While the fiber, web, or other product can be cooled rapidly, e.g., quenched, it is preferable to allow the product to slowly return to room temperature, e.g., over the course of several hours such as by cooling overnight.

When the polyarylene sulfide is PPS, the fiber, web, or other product is desirably heated to a temperature above about 88–97° C. ($T_g$), preferably above about 97° C. (which is the $T_g$ reported by J. Brandrup and E. H. Immergut (ed.), *Polymer Handbook,* 3d edition, page VI/80 (1989)). More preferably, the fiber, web, or other product is heated to a temperature above about 117–147° C. ($T_c$). The actual $T_c$ may vary with the particular PPS resin and/or the content of the polyolefin, e.g., polypropylene. The fiber, web, or other product is preferably not heated to above about 290–315° C. (which is the range of $T_m$'s reported by J. Brandrup and E. H. Immergut (ed.), *Polymer Handbook,* 3d edition, page VI/242 (1989)). Typically, such a fiber, web, or other product will be heated to about 120–170° C., more typically to about 130–160° C., and most typically to about 130–150° C., for a sufficient period of time to impart the desired properties to the fiber, web, or other product.

The present inventive products, particularly the present inventive fiber and web, can be surface modified, e.g., chemically modified, in any suitable manner. For example, the fiber or web can be rendered hydrophilic, or hydrophobic groups such as fluoropolymers can be bound to the surface of the fiber or web. Such surface modification desirably takes place after any heat-treatment as described above.

For many applications, it is desirable that the present inventive fiber and web have a particular critical wetting surface tension (CWST). CWST is described in detail in U.S. Pat. No. 4,880,548. The CWST of a porous medium is defined as that which is equal to the average of the surface tensions of two liquids of which one is absorbed when a drop of the liquid is applied to the surface of the porous medium, while a drop of slightly higher surface tension liquid, for example two mN/m higher, will not be absorbed. The present inventive fiber and web preferably have a CWST of about 70 mN/m (about 70 dynes/cm) or higher, more preferably about 100 mN/m (about 100 dynes/cm) or higher, and most preferably about 115 mN/m (about 115 dynes/cm) or higher. A desirable property of the fiber and web of the present invention is the wettability in an aqueous potassium hydroxide (38–42%) solution. A fiber or web having a CWST of about 115 mN/m (about 115 dynes/cm) or higher will be readily wetted by such a potassium hydroxide solution.

The fiber and web of the present invention can be surface modified to any suitable CWST by any suitable technique. The fiber and web can be, for example, plasma or corona treated, or chemically treated with suitable oxidizing agents such as chromic acid, hypochlorite, nitric acid, or ozone, to modify the CWST.

The present inventive fiber and web are preferably subjected to a gas plasma treatment to substantially increase the CWST of the web. Any suitable method, batch or continuous, of plasma treatment known to those of ordinary skill in the art can be employed. For example, the fiber or web can be placed in an evacuated quartz chamber, and a suitable gas or vapor can be admitted into the chamber. A suitable voltage can be imposed between the electrodes suitably positioned in the chamber. The plasma generated is maintained for a sufficient period of time to cause the surface modification. Hydrophilic surface modifications can be advantageously created by employing a polar gas such as air or oxygen as the plasma medium. Thus, oxygen can be admitted into the chamber, at a suitable pressure, for instance, in the range of about 20 to 700 $\mu$m Hg, and a plasma can be generated and maintained for a suitable period of time to effect the desired change in CWST. It has been observed that the fiber and web of the present invention can be oxygen plasma treated to increase the CWST from about 50 mN/m to about 115 mN/m or greater. The plasma treated fiber and web of the present invention have been found to be readily wettable by a 45% aqueous potassium hydroxide solution.

Alternatively, the fiber or web surface can be modified by grafting hydrophilic or hydrophobic monomers known to those of ordinary skill in the art. Suitable hydrophilic monomers include hydroxyethylacrylate, hydroxypropylacrylate, hydroxyethylmethacrylate, hydroxypropylmethacrylate, and the like. Suitable hydrophobic monomers include olefins, alkyl acrylates and methacrylates, haloolefins, and haloalkyl acrylates and methacrylates, wherein the alkyl group has 1–20 carbon atoms. The halogen can be any suitable halogen, preferably fluorine. Any suitable method of grafting can be employed, including radiation grafting. The source of radiation can be from, for example, radioactive isotopes like Cobalt 60, Strontium 90, and Cesium 137, or from machines like x-ray machines, electron accelerators, and ultraviolet equipment. Grafting typically will be achieved by irradiating the fiber or web and then exposing it to a suitable solution of the monomer. Alternatively, the fiber or web can be irradiated while exposed to a suitable solution of the monomer. Regardless of which procedure is used, the grafting should be conducted in the absence of oxygen, e.g., under a nitrogen atmosphere, since oxygen will react with the reactive sites created by radiation exposure, thereby lowering the number of sites available for the desired polymer bonding. If the fiber or web is irradiated prior to immersion in the monomer solution, the fiber or web should contact the monomer solution as quickly as possible to avoid undesirable reactions resulting in the loss of reactive sites for bonding the polymer to the surface of the fiber or web. The monomer solution can comprise any suitable concentration of the monomer to be graft polymerized, typically 1–10 vol. % monomer in a solvent system, generally water by itself or with a suitable alcohol such as t-butyl alcohol. For example, such a monomer solution can comprise 1.5 vol. % hydroxypropylacrylate, 25 vol. % t-butyl alcohol, and 73.5 vol. % deionized water. The details and parameters of the polymer grafting of fibers is well known in the art.

While the graft polymerization can be carried out in the absence of crosslinking agents, it is preferred that such crosslinking agents be used, particularly when the aforementioned acrylate monomers are graft polymerized onto the surface of the fibers. Any suitable crosslinking agent can be used in the context of the present invention.

Suitable crosslinking agents include di- or poly-acrylates and methacrylates of diols and polyols, particularly linear or branched aliphatic diols such as ethylene glycol, 1,2-propylene glycol, diethylene glycol, dipropylene glycol, dipentylene glycol, polyethylene glycol, polypropylene glycol, polytetramethylene-oxide glycol, and poly(ethylene oxide-copropylene-oxide)glycol, as well as triol acrylates such as trimethylolpropane triacrylate. Other crosslinking monomers that may be used in the instant invention include allyls, maleimides, unsaturated dicarboxylic acids, aromatic vinyl compounds, polybutadienes, and trimellitic acid esters.

The present inventive fiber, web, and resin composition can be used in a variety of products and applications, including, but not limited to, those products and applications which currently utilize conventional polyarylene sulfide fibers, webs, and resin compositions. For example, the present inventive web can be employed as a filter element (e.g., in combination with a suitable housing to form a filtration device or assembly) to remove particles from fluids, such as contaminated liquid and gas streams, and as a microfiltration membrane. The web can also serve as an integral part of an ultrafiltration membrane or reverse osmosis membrane, for instance, as a membrane support material. Moreover, the web, particularly a woven fabric produced from the present inventive fibers, can be fabricated into a protective garment effective against heat and hazardous chemicals. In addition, the fibrous nonwoven web of the present invention can be used as a porous separator, e.g., in batteries and electrolyzers.

The fiber and web of the present invention can be configured in any suitable configuration, including flat sheet, pleated sheet, tubular (seamed or seamless), corrugated, and spiral-wound configurations. The resins of the present invention can also be converted by suitable melt-processing into other products such as filaments, nettings, and hollow fibers.

The following examples further illustrate the present invention and, of course, should not be construed as in any way limiting its scope.

EXAMPLE 1

This example illustrates the difficulties involved in the melt blowing of PPS resin only and the benefits of using a polyolefin additive, specifically polypropylene (PP), with the PPS.

The PPS resin used in the melt blowing operation set forth herein was the E2481 resin from Toray PPS, Inc. The polypropylene used was Exxon PP3045.

The PPS resin was initially dried in a pressure swing, two-column, desiccant dryer, specifically a WHITLOCK™ drier (available from A.C. Whitlock Inc., Wood Dale, Ill.), at 149° C. (300° F.) for 6 hours, cooled in dry air, and placed in an air-tight hopper until use. It was then melt blown (with and without various amounts of added polypropylene based on the weight of the total blend) by employing an extruder equipped with a gear pump, two dies each having a set of fiberizing nozzles, and a cylindrical mandrel of 19 mm (0.75 inch) diameter. The distance between the dies and the axis of the mandrel was 86 mm (3.4 inches). The mandrel was translated forward and backward to collect the melt blown fibers from the nozzles in the form of a web or felt. Additional details of the melt blowing apparatus and the procedure are set forth in U.S. patent application Ser. No. 08/281,772 and PCT application PCT/US95/09972.

The fiber preparation conditions and the resulting characteristics are set forth in Table 3. The temperature of the melted resin was measured at two locations along the length of the extruder. For example, for Run 1A, the two temperatures were 383° C. (722° F.) and 347° C. (656° F.). The left side die was at 362.8° C. (685° F.), and the right side die was at 363.3° C. (686° F.). The pressure at the dies was in the range of 3.58–4.27 MPa (520–620 psi). The void volume % of the resulting web and the performance evaluation are also set forth in Table 3.

Void volume % of the web was measured as follows.

$$\text{Void Volume \%} = 100 \times \left[ 1 - \frac{\text{actual density}}{\text{theoretical density}} \right]$$

The actual density of the web was determined from the weight of the web, and its volume was calculated from its thickness and area. The theoretical density of the web was determined from the formula:

$$\frac{W_1 d_1 + W_2 d_2 + \cdots}{W_1 + W_2 + \cdots}$$

wherein $W_1$ and $W_2$ are the weights, and $d_1$ and $d_2$ are the densities, of the fiber components. The densities of PPS and polypropylene employed were 1.36 and 0.90 g/ml, respectively.

TABLE 3

MELT BLOWING OF PPS AND PPS + PP BLENDS: TEST CONDITIONS AND RESULTS

| Run No. | Material | Melt Temperature ° C. (° F.) 1 | Melt Temperature ° C. (° F.) 2 | Die Metal Temperature, ° C. (° F.) Left | Die Metal Temperature, ° C. (° F.) Right | Die Pressure, MPa (psi) | Void Volume % | Performance |
|---|---|---|---|---|---|---|---|---|
| 1A | PPS | 383 (722) | 347 (656) | 362 (685) | 363 (686) | 3.58–4.27 (520–620) | 75.2 | Nozzles dribbled after about 2 |
| 1B | PPS | 368 (695) | 348 (659) | 366 (691) | 366 (690) | 4.48–4.82 (650–700) | 75.6 | Leakage of molten polymer |
| 1C | PPS + 3% PP | 367 (694) | 347 (657) | 371 (700) | 369 (696) | 3.83 (557) | 76.0 | Operated well; nozzles began to dribble after 2.5 hours |
| 1D | PPS + 5% PP | 362 (685) | 342 (647) | 352 (666) | 353 (667) | 3.79 (550) | 76.4 | Good, prolonged run obtained; maintained clean nozzles with minimal effort. |
| 1E | PPS + 10% PP | 351 (663) | 343 (650) | 352 (665) | 349 (660) | 6.06–6.48 (880–940) | 75.9 | Nozzles performed well. |

TABLE 3-continued

MELT BLOWING OF PPS AND PPS + PP BLENDS:
TEST CONDITIONS AND RESULTS

| Run No. | Material | Melt Temperature ° C. (° F.) 1 | 2 | Die Metal Temperature, ° C. (° F.) Left | Right | Die Pressure, MPa (psi) | Void Volume % | Performance |
|---|---|---|---|---|---|---|---|---|
| 1F | PPS + 20% PP | 351 (663) | 342 (649) | 351 (663) | 349 (660) | 3.72–4.96 (540–720) | 77.1 | Machine started well and then progressively got worse. |
| 1G | PPS + 5% PP | 351 (663) | 342 (649) | 351 (663) | 349 (660) | 6.03 (875) | 76.9 | Machine ran well for a long time with minimum attention |

As shown in Table 3, Run 1A, the process with PPS alone worked well for a short period of time. The fibers had an average diameter of 5–7 $\mu$m. After about 2 hours of operation, however, the nozzles dribbled melted polymer, and the operation could not be maintained.

Run 1B further illustrates the difficulties involved in melt blowing PPS resin only. PPS resin was dried, cooled, and stored as described earlier. As can be seen from Table 3, the process had to be aborted due to the severe leakage of molten polymer from the extruder. The pressure at the dies was in the range of 4.48–4.82 MPa (650–700 psi), a pressure that was higher than that encountered in the earlier run set forth above. The leakage is believed to be due to excessive pressure at the dies caused by the crosslinked or charred material.

Run 1C illustrates the benefits of employing 3% polypropylene, based on the weight of the total blend, as an additive in preparing melt blown PPS fibrous webs. PPS was dried and stored as set forth earlier. Polypropylene was added to the dried PPS and mixed until a uniform mixture was obtained. The test conditions and the results are set forth in Table 3. The web produced had an acceptable void volume of 76.0%. The fibers had an average diameter of 3–4 $\mu$m. The machine operated well without trouble for 2.5 hours, when one nozzle started to dribble. After about 3 hours, several nozzles started to dribble, and the melt blowing had to be stopped at that time.

Run 1D illustrates the benefits of employing 5% polypropylene, based on the weight of the total blend, as an additive in preparing melt blown PPS fibrous webs. The machine ran well for 2 hours without encountering serious difficulties. Occasionally the nozzles needed some attention; however, the nozzles recovered with minimum effort. The webs had an acceptable void volume of 76.4%. The fibers had an average diameter of 3–4 $\mu$m.

Run 1E illustrates the benefits of employing 10% polypropylene, based on the weight of the total blend, as an additive in preparing melt blown PPS fibrous webs. The machine ran well for 2 hours without encountering any difficulties. The produced webs had an acceptable void volume of 75.9%. The fibers had an average diameter of 3–4 $\mu$m.

Run 1F illustrates the benefits of employing 20% polypropylene, based on the weight of the total blend, as an additive in preparing melt blown PPS fibrous webs. Initially the machine ran well and then progressively got worse. The fiber stream was contaminated with shots, although the produced webs had an acceptable void volume of 77.1%.

Run 1G further illustrates the benefits of employing 5% polypropylene, based on the weight of the total blend, as an additive in the continuous operation of the melt blowing apparatus for preparing melt blown PPS fibrous webs. The machine ran well for 8 hours without encountering any difficulties. The produced webs had an acceptable void volume of 76.9%. The fiber had an average diameter of 3–4 $\mu$m.

EXAMPLE 2

This example demonstrates the presence of polypropylene in the polyarylene sulfide blend fibers of the present invention.

Figure 1:
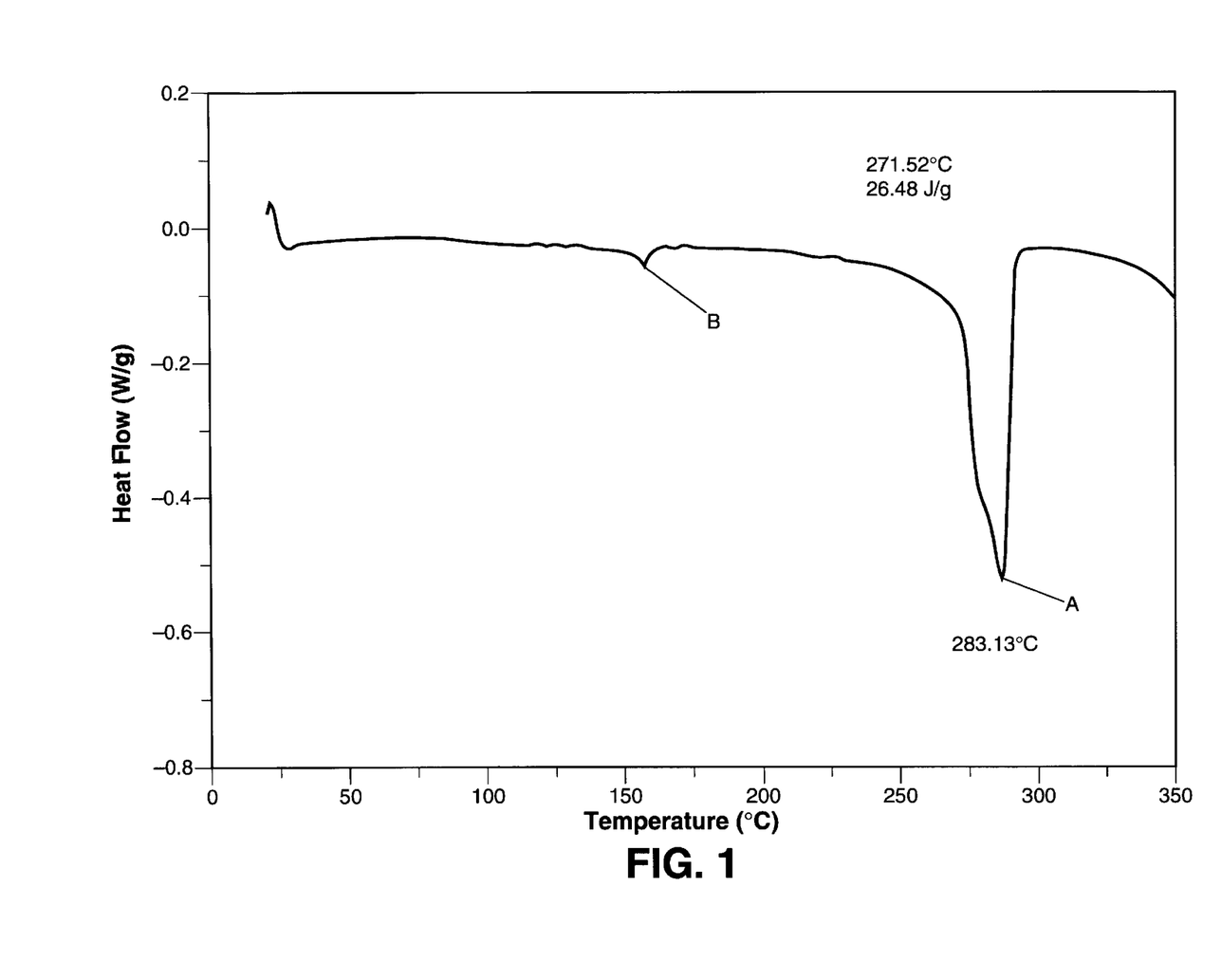
FIG. 1 depicts the Differential Scanning Calorimetric (DSC) thermogram of a fibrous web sample made from a blend of PPS and polypropylene wherein the polypropylene was 3% by weight of the total blend. The x-axis represents the temperature of scanning, and the y-axis represents the heat flow (watts/gram) from or to the sample. Peak "A" represents the melting exotherm of PPS, and peak "B" represents the melting exotherm of polypropylene.

A fibrous web sample having 3% polypropylene based on the weight of the total blend and prepared as in Run 1C of Example 1 was subjected to DSC analysis. The resulting thermogram is shown in FIG. 1. The DSC thermogram showed two peaks. Peak "A", centered at about 283° C., corresponds to the melting of PPS. Peak "B", centered at about 155° C., corresponds to the melting of polypropylene. Thus, DSC analysis confirmed the presence of the polypropylene in the melt blown PPS blend fibers.

EXAMPLE 3

This example further demonstrates the presence of polypropylene in the polyarylene sulfide blend fibers of the present invention.

The sulfur contents were determined of fibers made from PPS only and fibers made from a blend of PPS and 5% polypropylene by weight of the total blend. The PPS only fibers (3 samples) had an average sulfur content of 29.44%±0.12%, and the blend fibers (3 samples) had an average sulfur content of 28.43%±0.06%.

The theoretical sulfur content of PPS is 29.65%, as calculated from its molecular formula $C_6H_4S$. The difference between the theoretical and the actual sulfur content of PPS only fibers may be due to the presence of hydrocarbonous impurities, approximately about 1% by weight, formed by the decomposition of PPS during the melt blowing operation.

The theoretical sulfur content of a blend containing PPS and 5% polypropylene by weight of the total blend is 28.17%. The actual sulfur content, namely, 28.43%±0.06%, confirms that polypropylene is present in the melt blown PPS blend fibers at a concentration of about 5%.

EXAMPLE 4

This example additionally demonstrates the presence of polypropylene in the polyarylene sulfide blend fibers of the present invention and confirms that the polypropylene is bound tightly within the polyarylene sulfide blend fibers.

8.7119 g of a fibrous web containing PPS and 5% polypropylene based on the weight of the total blend, which was prepared as in Run 1G of Example 1, were refluxed with 250 ml of boiling xylene for 12 hours. The xylene layer was then separated from the web and evaporated to obtain a residue of 72.8 mg.

In another experiment, 9.9938 g of a fibrous web containing only PPS were refluxed with 250 ml of boiling xylene for 12 hours. The xylene layer was then evaporated to obtain a residue of 40.2 mg.

A control experiment was conducted by evaporating 250 ml of xylene, and a residue of 0.9 mg was obtained.

From the foregoing results, it was calculated that the PPS only fibers lost 0.40% of their weight and that the PPS blend fibers lost 0.83% of their weight. Free polypropylene is soluble in xylene and, therefore, will be readily extracted by boiling xylene if polypropylene is present in a free state in the blend. However, the relatively small weight loss of the PPS blend fibers during the xylene extraction indicates that the polypropylene is bound tightly within the PPS matrix.

EXAMPLE 5

This example further illustrates the benefits of employing polypropylene as an additive in the preparation of polyarylene sulfide fibers of the present invention.

Donut shaped samples of PPS only fibrous webs and PPS blend fibrous webs containing 5% polypropylene based on the weight of the total blend, having 22.4 mm (0.875 inch) ID and 32 mm (1.25 inch) OD, were placed side by side in an air circulation oven at 148° C. (300° F.), 171° C. (340° F.), and 227° C. (440° F.) for 2 hours.

At 148° C., the PPS only samples darkened and shrunk in size; they turned very stiff and hard. Individual fibers could not be separated. In contrast, the PPS blend samples survived well. The color was light, and the fibrous structure was still apparent.

At 171° C. and 227° C., the PPS only samples turned very dark and showed severe shrinkage and distortion. In contrast, the PPS blend samples were lighter in color and survived the heat treatment with less distortion than the PPS only samples.

Thus, the fibers of the present invention exhibit improved stability when exposed to hot air.

EXAMPLE 6

This example further illustrates the benefits of employing polypropylene as an additive in the preparation of the polyarylene sulfide fibers of the present invention.

Donut shaped samples of PPS only fibrous webs and PPS blend fibrous webs containing 5% polypropylene based on the weight of the total blend, having 22.4 mm (0.875 inch) ID and 32 mm (1.25 inch) OD, were soaked in deionized water in a pipe bomb. The pipe bomb was maintained at 177° C. (350 10° F.). At the end of one week, the PPS only webs showed a slight reduction in size as well as some hardening. The PPS blend webs remained unchanged.

Thus, the fibers of the present invention exhibit improved stability when exposed to hot water.

EXAMPLE 7

This example further illustrates the benefits of employing polypropylene as an additive in the preparation of the polyarylene sulfide fibers of the present invention.

Donut shaped samples of PPS only fibrous webs and PPS blend fibrous webs containing 5% polypropylene based on the weight of the total blend, having 22.4 mm (0.875 inch) ID and 32 mm (1.25 inch) OD, were soaked in soy oil in a pipe bomb. The pipe bomb was maintained at 227° C. (400° F.).

At the end of one week, the PPS only webs showed some hardening and some delamination of the fibrous layers. The PPS blend webs remained unchanged. At the end of the second week, the PPS only webs became rigid. The PPS blend webs remained unchanged. At the end of the third week, the PPS only webs exhibited a significant reduction in size, and surface bubble formation took place. The PPS blend webs showed only some slight expansion, and the layers appeared more visible, indicative of delamination.

Thus, the fibers of the present invention exhibit improved stability when exposed to hot soy oil.

EXAMPLE 8

This example further illustrates the benefits of employing polypropylene as an additive in the preparation of the polyarylene sulfide fibers of the present invention.

Donut shaped samples of PPS only fibrous webs and PPS blend fibrous webs containing 5% polypropylene based on the weight of the total blend, having 22.4 mm (0.875 inch) ID and 32 mm (1.25 inch) OD, were soaked in a 30% KOH solution in a pipe bomb at 174° C. (345° F.).

At the end of one week, the PPS only webs showed some shrinking. The PPS blend webs remained unchanged. Thus, the fibers of the present invention exhibit improved stability when exposed to a hot alkali solution.

EXAMPLE 9

This example further illustrates the benefits of employing polypropylene as an additive in the preparation of the polyarylene sulfide fibers of the present invention.

The troublesome black scale which built up on the melt blowing equipment components during the melt blowing of PPS alone was examined employing Scanning Electron Microscopy—X-ray Emission Spectroscopy. The SEM-XES analysis confirmed the presence of sulfur in the scale, and sulfur was the major element identified in the analysis. In addition, titanium, iron, silicon, chlorine, and certain other elements were identified in trace levels. The SEM-XES is incapable of identifying carbon and hydrogen. The black scale is believed to be polymerized PPS. In contrast, during the melt blowing of the PPS/polypropylene blend, the equipment was substantially free of the black scale.

Thus, it is clear that the present invention provides a superior melt blowing process for polyarylene sulfide while retaining, and in at least some respects enhancing, the desirable properties of the resulting polyarylene sulfide fibers.

EXAMPLE 10

This example illustrates the benefits of heat-treating products prepared from a blend of a polyarylene sulfide and a polyolefin in accordance with the present invention.

A series of tubular fibrous nonwoven webs was prepared from a blend of PPS and 5% polypropylene based on the weight of the total blend. The webs were supported with a thin-walled aluminum sleeve which snugly fit the inside of the tubular webs and then were heated at various temperatures ranging from about 82° C. to about 154° C. for either about 10 minutes or about 1 hour in an air circulation oven. The webs were either allowed to cool overnight in the oven or were quench cooled by removing them from the oven to room temperature. A control web was not subjected to any heat-treatment.

The various tubular webs were then subjected DSC analysis and/or tested for resistance to high temperature deformation by exposure to a temperature of about 138° C. for about 1 hour without support or restraint.

A DSC analysis of the control web, which was not subjected to any heat-treatment, revealed that the web was not substantially in the crystalline state. During the course of the heat test, the control web shrank, wrinkled, and did not retain its circular profile. Similarly, the DSC analysis of the web subjected to a heat-treatment for 1 hour at about 82° C., i.e., below $T_g$, and cooled overnight revealed that the web had not crystallized during the heat-treatment and would not withstand the heat test without being deformed.

The DSC analysis of the web heat-treated for 1 hour at about 96° C., i.e., roughly at about $T_g$, and cooled overnight revealed that the web substantially had crystallized; however, the web did exhibit slight shrinkage during the heat test. The DSC analyses of the webs heat-treated for 1 hour at about 110° C., 121° C., 129° C., and 135° C., i.e., at temperatures slightly below $T_c$ to somewhat above $T_c$, and cooled overnight revealed that the webs substantially had crystallized. Similarly, the DSC analysis of the web heat-treated for 10 minutes at about 154° C., i.e., significantly above $T_c$, and cooled overnight revealed that the web substantially had crystallized. The DSC analysis of the web heat-treated for 10 minutes at about 154° C. and immediately removed from the oven to room temperature, i.e., quench cooled, revealed that the web had largely, but not substantially, crystallized. The various webs demonstrating substantial crystallization did not exhibit any deformation in the heat test, thereby demonstrating the desirable heat-resistance obtained by the heat-treatment or annealing of the present inventive fibers, webs, and other products.

All of the references cited herein, including patents, patent applications and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A melt blown fiber consisting essentially of a polyarylene sulfide and a polyolefin wherein said polyolefin is present in an amount of about 40% or less by weight of the total blend.

2. The fiber of claim 1, wherein said polyolefin is present in an amount of about 20% or less by weight of the total blend.

3. The fiber of claim 2, wherein said polyarylene sulfide is a polyphenylene sulfide.

4. The fiber of claim 3, wherein said polyolefin is polypropylene.

5. The fiber of claim 4, wherein said polypropylene is present in an amount of from about 2–10% by weight of the total blend.

6. The fiber of claim 5, wherein said polypropylene is present in an amount of from about 5% by weight of the total blend.

7. The fiber of claim 5, wherein said polyphenylene sulfide is substantially in the crystalline phase.

8. A melt blown fibrous nonwoven web comprising a multitude of the fibers of claim 1.

9. A melt blown fibrous nonwoven web comprising a multitude of the fibers of claim 2.

10. A melt blown fibrous nonwoven web comprising a multitude of the fibers of claim 3.

11. A melt blown fibrous nonwoven web comprising a multitude of the fibers of claim 4.

12. A melt blown fibrous nonwoven web comprising a multitude of the fibers of claim 5.

13. A melt blown fibrous nonwoven web comprising a multitude of the fibers of claim 6.

14. The web of claim 12, wherein said web comprises fibers having an average diameter of about 5 μm or less.

15. The web of claim 12, wherein said polyphenylene sulfide is substantially in the crystalline phase.

16. A filtration device comprising a housing and the melt blown fibrous nonwoven web of claim 8.

17. A filtration device comprising a housing and the melt blown fibrous nonwoven web of claim 9.

18. A filtration device comprising a housing and the melt blown fibrous nonwoven web of claim 10.

19. A filtration device comprising a housing and the melt blown fibrous nonwoven web of claim 11.

20. A filtration device comprising a housing and the melt blown fibrous nonwoven web of claim 12.

21. A filtration device comprising a housing and the melt blown fibrous nonwoven web of claim 13.

22. A filtration device comprising a housing and the melt blown fibrous nonwoven web of claim 14.

23. A filtration device comprising a housing and the melt blown fibrous nonwoven web of claim 15.

* * * * *